(12) United States Patent
Inagaki et al.

(10) Patent No.: US 6,884,548 B2
(45) Date of Patent: Apr. 26, 2005

(54) NONAQUEOUS ELECTROLYTE BATTERY CONTAINING AN ALKALI, TRANSITION METAL NEGATIVE ELECTRODE

(75) Inventors: Hiroki Inagaki, Yokohama (JP); Norio Takami, Yokohama (JP); Tatsuoki Kohno, Tokyo-to (JP); Tomokazu Morita, Funabashi (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 10/329,418

(22) Filed: Dec. 27, 2002

(65) Prior Publication Data

US 2003/0124426 A1 Jul. 3, 2003

Related U.S. Application Data

(63) Continuation of application No. 09/635,239, filed on Aug. 9, 2000, now Pat. No. 6,541,157.

(30) Foreign Application Priority Data

Aug. 9, 1999 (JP) ............................................. 11-225491
Mar. 30, 2000 (JP) ...................................... 2000-095529

(51) Int. Cl.⁷ ............................................. H01M 4/48
(52) U.S. Cl. .................. 429/231.95; 429/233; 429/241; 429/242; 429/245
(58) Field of Search ........................... 429/231.95, 233, 429/241, 242, 245, 231.9

(56) References Cited

U.S. PATENT DOCUMENTS 5,618,640 A    4/1997  Idota et al.
6,541,157 B1 * 4/2003  Inagaki et al. ........... 429/231.9

FOREIGN PATENT DOCUMENTS

JP    9106808      4/1997
JP    9-106808   * 4/1997    ............ H01M/4/02

OTHER PUBLICATIONS

J. Yang et al., "Small particle size multiphase Li–alloy anodes for Lithium–ion–batteries", Solid State Ionics, 90, 1996, pp. 281–287.

* cited by examiner

Primary Examiner—Dah-Wei Yuan
(74) Attorney, Agent, or Firm—Oblon, Spivak, McClelland, Maier & Neustadt, P.C.

(57) ABSTRACT

It is intended to provide a nonaqueous electrolyte battery that satisfies both of a large discharge capacity and a superior cycle life characteristic by developing a novel negative electrode material. A nonaqueous electrolyte battery uses a negative electrode active material that is a compound expressed by Formula (1):

$$A_zMX_y \qquad (1)$$

where A is at least one element selected from the alkali metals, M is at least one element selected from the group consisting of Ti, V, Cr, Mn, Fe, Co, Ni, Cu, Ru, Rh, Pd, Os, Ir, Pt, and Mg, X is at least one element selected from the group consisting of B, N, Al, Si, P, Ga, Ge, As, In, Sn, Sb, Pb, and Bi, $0 \leq z \leq 20$, and $0.2 \leq y \leq 6$.

12 Claims, 1 Drawing Sheet

NONAQUEOUS ELECTROLYTE BATTERY CONTAINING AN ALKALI, TRANSITION METAL NEGATIVE ELECTRODE

This application is a continuation of application Ser. No. 09/635,239 filed Aug. 9, 2000, which is now U.S. Pat. No. 6,541,157.

BACKGROUND OF THE INVENTION

1. Field of the Invention

The present invention relates to a nonaqueous electrolyte battery and, more specifically, to a nonaqueous electrolyte battery having an improved negative electrode active material.

2. Description of the Background

Nonaqueous electrolyte secondary batteries using, as a negative electrode active material, metallic lithium, a lithium alloy, a lithium compound, a carbon material, or the like are anticipated to become good high energy density batteries and are now researched and developed extensively. So far, a wide variety of lithium ion batteries that use $LiCoO_2$, $LiMn_2O_4$, or the like as a positive electrode material and a carbon material capable of inserting and de-inserting lithium as a negative electrode active material have been put into practical use.

On the other hand, although secondary batteries using, as a negative electrode active material, metallic lithium, a lithium alloy, a lithium compound are anticipated to exhibit a large capacity, they have not been put into practical use yet for the following main reasons. The use of metallic lithium is associated with problems that lithium deteriorates owing to reaction between a nonaqueous electrolyte liquid and metallic lithium and that desorption of the negative electrode active material that is caused by dendrite-like (bark-like) lithium produced by repetition of charging and discharging causes internal short circuiting or shortens the cycle life. To solve these problems, studies have been made in which a lithium alloy or a lithium compound is used as a negative electrode. However, in particular, in the case of using an alloy such as a lithium-aluminum alloy, although the charging/discharging efficiency is increased by virtue of reduction in the degree of reaction between the negative electrode active material and the nonaqueous electrolyte liquid, improvement in cycle life characteristic is insufficient because repetition of deep charging and discharging causes pulverization of the electrode.

From the viewpoint of increasing the negative electrode capacity, it has been proposed to use a chalcogen compound such as an oxide as a negative electrode active material. For example, it has been proposed to improve the cycle life characteristic by using SnO or $SnO_2$ (Japanese Unexamined Patent Publication Numbers Hei. 7-122274 and Hei. 7-235293) or an amorphous oxide such as $SnSiO_3$ or $SnSi_{1-x}P_xO_3$. However, even the use of those chalcogen compounds has not yet improved or increased the cycle life and the capacity sufficiently. A need, therefore, continues to exist for a nonaqueous electrolyte battery which is not burdened by these problems.

SUMMARY OF THE INVENTION

Accordingly, one object of the invention is to provide a nonaqueous electrolyte battery having a large capacity and a long cycle life by using a negative electrode active material that has a large capacity and is superior in charging/discharging cycle performance.

The invention provides a nonaqueous electrolyte battery comprising a positive electrode, a negative electrode having a negative electrode active material that inserts and de-inserts an alkali metal, and a nonaqueous electrolyte. The negative electrode active material is a compound that is expressed by Formula (1):

$$A_zMX_y \qquad (1)$$

where A is at least one element selected from the alkali metals, M is at least one element selected from the group consisting of Ti, V, Cr, Mn, Fe, Co, Ni, Cu, Ru, Rh, Pd, Os, Ir, Pt, and Mg, X is at least one element selected from the group consisting of B, N, Al, Si, P, Ga, Ge, As, In, Sn, Sb, Pb, and Bi, $0 \leq z \leq 20$, and $0.2 \leq y \leq 6$.

DETAILED DESCRIPTION OF THE PREFERRED EMBODIMENTS

Figure 1:
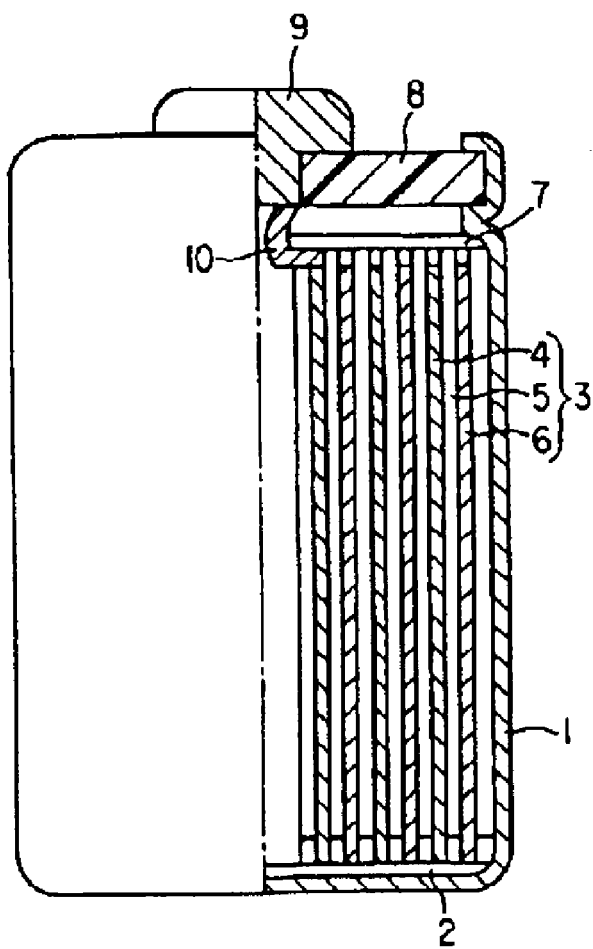
FIG. 1 is a partial sectional view of an example of a nonaqueous electrolyte battery (cylindrical nonaqueous electrolyte secondary battery) according to the present invention.

By using, as a negative electrode active material, the compound expressed by Formula (1), a large amount of alkali metal such as Li is inserted, the reversibility of the insertion/de-insertion reaction is increased, and the pulverization problem that is associated with a charging/discharging cycle is solved, whereby a battery having a long life and a large capacity can be obtained. This is because by virtue of the presence of M atoms the compound that is expressed by Formula (1) is kept stable in structure even if it inserts an alkali metal and hence crystal pulverization due to structural variation is inhibited.

In particular, from the viewpoint of increasing the capacity and battery life, it is desirable that M be at least one element selected from the group consisting of Co, Fe, Ni, Cu, and Cr, and that X be at least one element selected from the group consisting of Al, P, As, Sb, and Bi.

From the viewpoint of increasing the capacity and the life, it is desirable that X include Sb as a main component.

From the viewpoint of increasing the life, it is desirable that the compound expressed by Formula (1) have at least one structure selected from the group consisting of an NiAs structure, a $FeS_2$ structure, and a $CoAs_3$ structure. Where the compound has any of these structures, in particular the volume expansion when it inserts an alkali metal is suppressed and hence crystal pulverization is inhibited.

It is desirable that the compound expressed by Formula (1) have an average crystal particle diameter that is greater than or equal to 1 nm and less than or equal to a value given by Formula (2):

$$3.0/\{(V_1-V_0)/V_0\}^2 [nm] \qquad (2)$$

where $V_0$ and $V_1$ are volumes of the compound before and after charging, respectively.

By controlling the crystal particle diameter in the above range, the volume variation due to insertion or de-insertion of an alkali metal is reduced and the life is thereby increased.

It is desirable that the compound expressed by Formula (1) have an average particle diameter in a range of 0.01–100

μm. By controlling the crystal particle diameter in the above range, the volume variation due to insertion or de-insertion of an alkali metal is reduced and the life is thereby increased.

It is preferable that the negative electrode include the compound expressed by Formula (1) and a nitride that is expressed by Formula (3):

$$A'_a M'_b N \tag{3}$$

where A' is at least one element selected from the alkali metals, M' is at least one element selected from the group consisting of Mn, Fe, Co, Ni, and Cu, $0<a\leq 3$, and $0\leq b\leq 1$.

By adding the nitride that is expressed by Formula (3), the volume expansion due to occlusion of an alkali metal is reduced and the life is thereby increased. Further, the initial Coulomb efficiency is increased.

A nonaqueous electrolyte battery (e.g., a cylindrical nonaqueous electrolyte secondary battery) according to the invention will be described below in detail with reference to FIG. 1.

For example, an insulator 2 is provided at the bottom of a container 1 that is made of stainless steel and assumes a cylinder having a bottom. An electrode group 3 is accommodated in the container 1. The electrode group 3 has a structure that a band-like member formed by stacking a positive electrode 4, a separator 5, a negative electrode 6 are wound in a spiral in such a manner that one of the separators 5 is located outside.

An electrolyte is accommodated in the container 1. An insulating sheet 7 having an opening at the center is disposed over the electrode group 3 in the container 1. An insulating sealing plate 8 is disposed in a top opening of the container 1 and fixed to the container 1 by caulking inward a portion of the container 1 that is adjacent to the top opening. A positive terminal 9 is fitted in a central hole of the insulating sealing plate 8. One end of a positive electrode lead 10 is connected to the positive electrode 4 and the other end is connected to the positive terminal 9. The negative electrode 6 is connected to the container 1 serving as a negative terminal via a negative electrode lead (not shown).

Next, the positive electrode 4, the separator 5, and the negative terminal 6 will be described in detail.

1) Positive Electrode

For example, the positive electrode is manufactured by properly suspending a positive electrode active material, a conductive material, and a binder in a solvent, applying a resulting suspension to a collector such as aluminum foil, drying the suspension, and pressing a resulting material into a band-like electrode.

The positive electrode active material is any of various kinds of oxides and sulfides such as manganese dioxide ($MnO_2$), lithium manganese composite oxides (e.g., $LiMn_2O_4$ and $LiMnO_2$), lithium nickel composite oxides (e.g., $LiNiO_2$), a lithium cobalt composite oxide ($LiCoO_2$), lithium nickel cobalt composite oxides (e.g., $LiNi_{1-x}Co_xO_2$), lithium manganese cobalt composite oxides (e.g., $LiMn_xCo_{1-x}O_2$), and vanadium oxides (e.g., $V_2O_5$). The positive electrode active material may also be any of various organic materials such as conductive polymer materials and disulfide polymer materials. Even preferably, the positive electrode active material may be any of a lithium manganese composite oxide ($LiMn_2O_4$), a lithium nickel composite oxide ($LiNiO_2$), a lithium cobalt composite oxide, ($LiCoO_2$), a lithium nickel cobalt composite oxide ($LiNi_{0.8}Co_{0.2}O_2$), lithium manganese cobalt composite oxides ($LiMn_xCo_{1-x}O_2$), and like materials all of which provide a high battery voltage.

Examples of the conductive material are acetylene black, carbon black, and graphite.

Examples of the binder are polytetrafluoroethylene (PTFE), polyvinylidene fluoride (PVdF), and fluoride rubbers.

It is preferable that the positive electrode active material, the conductive material, and the binder be blended at 80–95 wt. %, 3–20 wt. %, and 2–7 wt. %, respectively.

2) Separator

Example of the material of the separator are synthetic resin nonwoven fabric, polyethylene porous film, and polypropylene porous film.

3) Negative Electrode

For example, the negative electrode is manufactured by suspending a negative electrode active material, a conductive material, and a binder in a proper solvent, applying a resulting suspension to metal foil such as copper foil, drying the suspension, and pressing a resulting material into a band-like electrode that is composed of the negative electrode active material, the conductive material, and the binder.

The negative electrode active material should contain at least a compound that is expressed by Formula (1):

$$A_2 M X_y \tag{1}$$

where A is at least one element selected from the alkali metals, M is at least one element selected from the group consisting of Ti, V, Cr, Mn, Fe, Co, Ni, Cu, Ru, Rh, Pd, Os, Ir, Pt, and Mg, X is at least one element selected from the group consisting of B, N, Al, Si, P, Ga, Ge, As, In, Sn, Sb, Pb, and Bi, $0\leq z\leq 20$, and $0.2\leq y\leq 6$.

In Formula (1), Li is desirable as the element A because Li provides a high energy density. From the viewpoint of increasing the capacity and the life, it is desirable that M be at least one element selected from the group consisting of Co, Fe, Ni, Cu, and Cr, and that X be at least one element selected from the group consisting of Al, P, As, Sb, and Bi. In particular, it is desirable that X include Sb as a main component.

A combination that M is at least one element selected from the group consisting of Ni, Co and Fe and X is Sb is particularly preferable because it provides a particularly long life and large capacity. As for the element M, the order of desirability is Ni (most desirable), Co, and Fe.

In Formula (1), parameters z and y should satisfy $0\leq z\leq 20$ and $0.2\leq y\leq 6$. In particular, from the viewpoint of increasing battery life, it is desirable that z be in a range of $0.01\leq z\leq 10$. From the viewpoint of increasing the capacity and the life, it is desirable that y be in a range of $0.2\leq y\leq 3.2$. It is more desirable that y be in a range of $0.8\leq y\leq 3.2$.

Among the alkali-metal-containing compounds expressed by Formula (1), particularly desirable compounds are $Li_zNi_xFe_{1-x}Sb_y$, $Li_zNi_xFe_{1-x-w}Co_wSb_y$, $Li_zCo_xNi_{1-x}Sb_y$, $Li_zCo_xFe_{1-x}Sb_y$, $Li_zCoBi_{1-y}Sb_y$, $Li_zCoSi_y$, and $Li_zCoAl_y$, where $0\leq z\leq 20$, $0.2\leq y\leq 6$, $0\leq x\leq 1$, and $0\leq w\leq 1$.

More specifically, among the alkali-metal-containing compounds expressed by Formula (1), $Li_zNi_xFe_{1-x}Sb_3$, $Li_zNi_xFe_{1-x-w}Co_wSb_3$, $Li_zCo_xNi_{1-x}Sb_3$, $Li_zCo_xFe_{1-x}Sb_3$, $Li_zNi_xFe_{1-x}Sb_2$, $Li_zNi_xFe_{1-x-w}Co_wSb_2$, $Li_zCo_xNi_{1-x}Sb_2$, and $Li_zCo_xFe_{1-x}Sb_2$ are desirable, where $0\leq z\leq 20$, $0\leq x\leq 1$, and $0\leq w\leq 1$.

Specifically, among the compounds expressed by Formula (1) that contain no alkali metal, $NiSb_2$ is most desirable. $CoSb_2$ (most desirable), $FeSb_2$, $Fe_{0.5}Ni_{0.5}Sb_3$, and $CoSb_3$ are also desirable in this order.

It is desirable that the compound expressed by Formula (1) have a structure selected from the group consisting of an NiAs structure, a $FeS_2$ structure, and a $CoAs_3$ structure. Where the compound has any of these structures, in particular the volume expansion due to occlusion of an alkali metal is suppressed and hence crystal pulverization is inhibited.

Where the battery is a nonaqueous secondary battery and a compound (e.g., $LiCoO_2$, $LiMnO_2$, or $LiNiO_2$) originally containing an alkali metal A (e.g., Li) is used in the positive electrode, if an $MX_y$ compound (z=0) is used as the negative electrode active material, the alkali metal A (e.g., Li) moves from the positive electrode to the negative electrode when the battery is charged for the first time and the $MX_y$ compound turns to an $A_zMX_y$ compound ($Li_zMX_y$). That is, the $MX_y$ compound serves as the negative electrode of the secondary battery in such a manner as to insert and de-insert the alkali metal in a reversible manner. Even in a case where a compound containing an alkali metal A is used in the positive electrode to stabilize a charging/discharging cycle, it is desirable that a compound containing an alkali metal A so as to satisfy $0 \leq z \leq 20$ be used as the negative electrode active material. Where a compound originally containing no alkali metal A (e.g., $CoO_2$, $MnO_2$, or $NiO_2$) is used as the positive electrode active material, a compound $A_zMX_y$ (e.g., $Li_zMX_y$; $0 \leq z \leq 20$ and $0.8 \leq y \leq 6$) that originally contains an alkali metal or that is produced electrochemically, for example, by laminating an alkali metal and an $MX_y$ compound (z=0) may be used as the negative electrode active material.

Where the battery is a nonaqueous electrolyte primary battery, it is desirable that a compound originally containing no alkali metal be used in the positive electrode and a compound expressed by Formula (1) and containing an alkali metal so as to satisfy $0 \leq z \leq 20$ be used in the negative electrode.

It is desirable that the negative electrode active material have an average crystal particle diameter that is greater than or equal to 1 nm and less than or equal to a value given by Formula (2):

$$3.0/\{(V_1-V_0)/V_0\}^2 [nm] \quad (2)$$

where $V_0$ and $V_1$ are volumes of the compound before and after charging, respectively.

By controlling the crystal particle diameter in the above range, the volume variation due to insert or de-insert of an alkali metal is reduced and the life is thereby increased.

The pulverization that was conventionally problematic in alloy negative electrodes etc. is such that when insertion and de-insertion reactions are repeated while a large amount of alkali metal such as Li is inserted, cracks develop in particles as the volume varies and the electricity collecting efficiency lowers to a large extent. The pulverization problem does not occur if cracks do not develop when such volume variation is repeated. Through thermodynamic stress analysis, the inventors have found that the development of cracks can be inhibited by properly controlling the crystal particle diameter. The control method will be described below.

The energy of particles can be expressed by Equation (10):

$$U_{total} = U_0 - U_{strain} + U_{surface} \quad (10)$$

where $U_{total}$ is the total energy, $U_0$ is the internal energy of the particles, $U_{stain}$ is the strain energy inside the particles, and $U_{surface}$ is the surface energy of the particles.

If the shape of the particles is approximated by a dodecahedron, Equation (10) can be modified into Equation (11):

$$U_{total} = U_0 - 7.66 N U_{strain} + 20.65 N \gamma d^2 \quad (11)$$

where N is the number of particles, y is the surface energy of each particle, and d is the particle diameter.

Therefore, the destruction limit particle diameter $d_{critical}$ is given by Equation (12) and cracks do not develop in the particles if the particle diameter is smaller than $d_{critical}$:

$$d_{critical} = 1.80 \gamma / U_{strain} \quad (12)$$

Since $U_{strain} = \sigma^2/2E$ and $\sigma = \{E/3(1-2\nu)\} \{(V_1-V_0)/V_0\}$, Equation (12) is finally modified into Equation (13):

$$d_{critical} = 32.4 \gamma (1-2\nu)^2 /[E\{(V_1-V_0)/V_0\}^2][m]. \quad (13)$$

Therefore, the particle diameter is controlled so as to be smaller than $d_{critical}$ that is given by Equation (13), the pulverization is inhibited and the life of the active material can be increased.

Equation (2) is obtained by substituting physical property values of a common compound into Equation (13).

It is desirable that the negative electrode active material have an average particle diameter in a range of $0.01-100 \mu m$. If the average particle diameter is smaller than $0.01 \mu m$, it is difficult to uniformly disperse the negative electrode active material over the electrode surface. If the average particle diameter is larger than $100 \mu m$, the electrode surface is roughened, which is a factor of causing short-circuiting and shortening of battery life.

Where the negative electrode active material contains no alkali metal A, it is manufactured by mixing powders of M and X at a prescribed stoichiometric ratio and heat-treating the powders at 400–1,000° C., preferably at 400–800° C., in an inert gas atmosphere, a reducing atmosphere, or in a vacuum. In a heat treatment at a temperature lower than 400° C., it takes long time to form a compound through reaction; the productivity is low in this case. At a temperature higher than 1,000° C., evaporation dissipation of X atoms having a high vapor pressure is remarkable and the composition varies to a large extent from the state at the time of the mixing of the powders.

Where the negative electrode active material contains an alkali metal A, it is manufactured by mixing powders of $A_zX$, M, and X at a prescribed stoichiometric ratio and heat-treating the powders at 400–1,000° C., preferably at 400–800° C., in an inert gas atmosphere, a reducing atmosphere, or in a vacuum.

The negative electrode active material can be manufactured by other methods. For example, it can be synthesized by using an arc dissolution method, a high-frequency dissolution method, or the like. Grinding may be performed by using a ball mill, a vibration mill, a planetary ball mill, a jet mill, or the like. A liquid-phase rapid cooling method, a mechanical alloy method, a plating method, an evaporation method, a sputtering method, a CVD method, or the like may be used, and any of these methods may be combined with a heat treatment.

It is preferable that the negative electrode of the nonaqueous electrolyte battery include the compound expressed by Formula (1) and a nitride that is expressed by Formula (3):

$$A'_a M'_b N \quad (3)$$

where A' is at least one element selected from the alkali metals, M' is at least one element selected from the group consisting of Mn, Fe, Co, Ni, and Cu, $0 < a \leq 3$, and $0 \leq b \leq 1$.

By adding the nitride that is expressed by Formula (3), the nitride of Formula (3) reduces the volume variation that occurs in the compound of Formula (1) during charging and discharging and the life of the negative electrode is thereby increased. Further, since the addition of the nitride of Formula (3) allows an alkali metal to exist in the negative electrode in a stable manner, the initial Coulomb efficiency of the compound of Formula (1) can greatly be increased.

As for the material that is expressed by Formula (3), if parameter b is too small, the conductivity becomes low to cause fear that the battery characteristics may deteriorate. If parameter b is too large, transition metals are hard to form a solid solution. Therefore, parameter b should be in a range of $0.1 \leq b \leq 0.8$. To increase the stability of the crystal structure and provide a superior cycle life characteristic, it is preferable that parameter a be in a range of $1.5 \leq a \leq 3$.

Although no particular limitations are imposed on the manufacturing method of the material that is expressed by Formula (3), it can be manufactured by a solid-phase reaction method, for example. It is manufactured by mixing an $Li_3N$ powder and transition method element powders (starting materials) at a prescribed ratio that conforms to the composition of a target material and then heat-treating a resulting mixture in a high-purity nitrogen atmosphere. Heat treatment conditions of 400–800° C. and about 1–100 hours are proper.

As for the combination of the materials of Formulae (1) and (3), to equalize potential flat portions, it is preferable that the material of Formula (1) include Sb as an essential component and the material of Formula (3) include Co and Cu as essential components. The mixing ratio of the materials of Formulae (1) and (3) can be determined properly depending on the initial Coulomb efficiency values and the alkali metal contents of the respective materials. However, from the viewpoint of the volume energy density, it is preferable that the material of Formula (3) be added at 0.1–30 wt. %.

Examples of the conductive material are acetylene black, carbon black, and graphite.

Examples of the binder are polytetrafluoroethylene (PTFE), polyvinylidene fluoride (PVdF), fluoride rubbers, ethylene-butadiene rubber (SBR), and carboxymethylcellulose (CMC).

It is preferable that the negative electrode active material, the conductive material, and the binder be blended at 70–95 wt. %, 0–25 wt. %, and 2–10 wt. %, respectively.

4) Nonaqueous Electrolyte

Examples of the nonaqueous electrolyte are liquid electrolytes prepared by dissolving an electrolyte in a nonaqueous solvent, polymer gel-like electrolytes in which the above nonaqueous solvent and electrolyte are contained in a polymer material, polymer solid electrolytes in which only the above electrolyte is contained in a polymer material, and inorganic solid electrolytes exhibiting lithium ion conductivity.

Known nonaqueous solvents in which a lithium salt as an electrolyte is dissolved in a nonaqueous solvent of a lithium battery can be used as the liquid electrolyte. It is preferable to use a nonaqueous solvent that is mainly made of a cyclic carbonate such as ethylene carbonate (EC) or propylene carbonate (PC) or a mixed solvent of a cyclic carbonate and a nonaqueous solvent (hereinafter referred to as "second solvent") that is lower in viscosity than the cyclic carbonate.

Examples of the second solvent are cyclic carbonates such as dimethyl carbonate, methylethyl carbonate, and diethyl carbonate, γ-butyrolactone, acetonitrile, methyl propionate, ethyl propionate, cyclic ethers such as tetrahydrofuran and 2-methyltetrahydrofuran, and chain ethers such as dimethoxymethane and diethoxyethane.

Examples of the electrolyte are alkali salts, in particular, lithium salts. Examples of the lithium salt are lithium phosphate hexafluoride ($LiPF_6$), lithium borofluoride ($LiBF_4$), lithium arsenic hexafluoride ($LiAsF_6$), lithium perchlorate ($LiClO_4$), and lithium trifluorometasulfonate ($LiCF_3SO_3$). In particular, lithium phosphate hexafluoride ($LiPF_6$) and lithium borofluoride ($LiBF_4$) are preferable. It is preferable that the dissolution amount of the electrolyte with respect to the amount of the nonaqueous solvent be 0.5–2.0 mol/l.

The gel-like electrolyte is produced by dissolving the above solvent and electrolyte in a polymer material so as to establish a gel-like state. Examples of the polymer material are such polymers of a monomer as polyacrylonitrile, polyacrylate, polyvinylidene fluoride (PVdF), and polyethylene oxide (PEO) and copolymers with another monomer.

The solid electrolyte is produced by dissolving the above electrolyte in a polymer material and solidifying a resulting solution. Examples of the polymer material are such polymers of a monomer as polyacrylonitrile, polyvinylidene fluoride (PVdF), and polyethylene oxide (PEO) and copolymers with another monomer. Examples of the inorganic solid electrolyte are ceramic materials containing lithium. Among those ceramic materials are $Li_3N$ and $Li_3PO_4$—$Li_2S$—$SiS_2$ glass.

Although the cylindrical nonaqueous electrolyte secondary battery according to the invention was described above with reference to FIG. 1, the invention can similarly be applied to batteries of other shapes such as rectangular nonaqueous electrolyte batteries and button-type nonaqueous electrolyte batteries. The electrode group that is accommodated in the container of the battery is not limited to ones having a spiral shape; positive electrodes, separators, and negative electrodes may be stacked in this order.

Having now generally described this invention, a further understanding can be obtained by reference to certain specific examples which are provided herein for purposes of illustration only and are not intended to be limiting unless otherwise specified.

Details of the present invention will be described below with reference to embodiments illustrated in the drawings.

Embodiment 1 to Embodiment 58

Manufacture of Positive Electrode

A positive electrode having an electrode density of 3.0 $g/cm^3$ was manufactured by mixing together a lithium cobalt oxide ($LiCoO_2$; positive electrode active material) powder of 91 wt. %, acetylene black of 2.5 wt. %, graphite of 3 wt. %, and polyvinylidene fluoride (PVdF) of 4 wt. % with addition of an N-methylpyrrolydone (NMP) solution, applying a resulting mixture to a collector of 15-μm thick aluminum foil, and drying and pressing the mixture.

Manufacture of Negative Electrode

Manufacture of negative electrode in Embodiment 1

A Co powder having purity of 99% and an average particle diameter of 20 μm and a Sb powder having purity of 99.9% and an average particle diameter of 20 μm were mixed with each other at an atomic equivalent ratio of 1:3 and then stirred sufficiently with a V mixer. A resulting mixed powder was put in an alumina crucible and was caused to react with each other by heat-treating those at 600° C. for 24 hours in an argon gas flow. An XRD analysis on a heat-treated substance showed only one peak of a $CoSb_3$ phase having a skutterudite structure, which indicated that this substance has a $CoSb_3$ structure. The reaction product that cohered as a result of the reaction was ground into a $CoSb_3$ powder having an average particle diameter of 20 μm by using an agate mortar.

A negative electrode was produced by mixing together this $CoSb_3$ powder of 85 wt. %, graphite 5 wt. %, acetylene black 3 wt. %, and PVdF 7 wt. % with addition of an NMP solution, applying a resulting mixture to a collector of 12-μm thick copper foil, and drying and pressing the mixture.

Manufacture of Negative Electrode in Embodiment 2

A $Co_{0.5}Ni_{0.25}Fe_{0.25}Sb_3$ powder having an average particle diameter of 20 μm was obtained by mixing together a 325-mesh Co powder (average particle diameter: 20 μm), a 325-mesh Ni powder (average particle diameter: 20 μm), a 325-mesh Fe powder (average particle diameter: 20 μm), and a 325-mesh Sb powder (average particle diameter: 20 μm) at a prescribed mol ratio and heat-treating a resulting mixture at 600° C. for 24 hours in an argon atmosphere.

A negative electrode was produced by mixing together this $Co_{0.5}Ni_{0.25}Fe_{0.25}Sb_3$ powder of 85 wt. %, graphite 5 wt. %, acetylene black 3 wt. %, and PVdF of 7 wt. % with addition of an NMP solution, applying a resulting mixture to a collector of 12-μm thick copper foil, and drying and pressing the mixture.

Manufacture of Negative Electrode in Embodiment 44

An Mn powder having purity of 99% and an average particle diameter of 20 μm and an Sb powder having purity of 99.9% and an average particle diameter of 20 μm were mixed with each other at an atomic equivalent ratio of 2:1 and then stirred sufficiently with a V mixer. A resulting mixed powder was put in an alumina crucible and was caused to react with each other by heat-treating those at 600° C. for 120 hours in an argon gas flow. An XRD analysis on a heat-treated substance showed only one peak of an $Mn_2Sb$ phase having a $Cu_2Sb$ structure, which indicated that this substance is of an $Mn_2Sb$ single phase. The reaction product that cohered as a result of the reaction was ground into an $Mn_2Sb$ powder having an average particle diameter of 20 μm by using an agate mortar.

A negative electrode was produced by mixing together this $Mn_2Sb$ powder of 85 wt. %, graphite 5 wt. %, acetylene black 3 wt. %, and PVdF of 7 wt. % with addition of an NMP solution, applying a resulting mixture to a collector of 12-μm thick copper foil, and drying and pressing the mixture.

Manufacture of Electrode Group

An electrode group was manufactured by stacking the above-described positive electrode, a separator made of polyethylene porous film, the above-described negative electrode, and the same separator in this order and winding a resulting stacked member in a spiral so that the negative electrode becomes the outermost layer.

Preparation of Nonaqueous Electrolyte Liquid

A nonaqueous electrolyte liquid was prepared by dissolving lithium phosphate hexafluoride ($LiPF_6$) in a mixed solvent (volume mixing ratio: 1:2) of ethylene carbonate (EC) and methylethyl carbonate (MEC) at 1.0 mol/l.

Two kinds of cylindrical nonaqueous electrolyte secondary batteries according to Embodiments 1 and 2 were assembled as shown in FIG. 1 by accommodating the above electrode group and the electrolyte in a cylindrical stainless steel container having a bottom.

Nonaqueous electrolyte secondary batteries according to Embodiments 3–43, Embodiments 44–58, and Comparative Examples 1–9 were assembled that were the same as the nonaqueous electrolyte secondary battery of Embodiment 1 except that negative electrode materials shown in Tables 1, 2, and 3 are used, respectively.

For the thus-obtained batteries of Embodiments 1–43, Embodiments 44–58, and Comparative Examples 1–9, constant voltage charging (0.5 C, 4 V) was performed for 3 hours and then the capacity was measured after 0.5-C discharging (final discharge voltage: 2.4 V). The number of cycles after which the capacity decreased to 80% of the value at the first cycle was employed as the cycle life. Results are summarized in Tables 1–3.

TABLE 1

| Embodiment number | Negative electrode active material | Discharge capacity (mAh) | Cycle life (cycles) |
|---|---|---|---|
| Embodiment 1 | $CoSb_3$ | 2000 | 250 |
| Embodiment 2 | $Co_{0.5}Ni_{0.25}Fe_{0.25}Sb_3$ | 2000 | 300 |
| Embodiment 3 | $RhSb_3$ | 2000 | 250 |
| Embodiment 4 | $IrSb_3$ | 1900 | 200 |
| Embodiment 5 | $CoP_3$ | 1700 | 250 |
| Embodiment 6 | $RhP_3$ | 1750 | 200 |
| Embodiment 7 | $IrP_3$ | 1800 | 200 |
| Embodiment 8 | $CoAs_3$ | 1800 | 250 |
| Embodiment 9 | $RhAs_3$ | 1800 | 250 |
| Embodiment 10 | $IrAs_3$ | 1850 | 200 |
| Embodiment 11 | $Fe_{0.1}Co_{0.8}Ni_{0.1}Sb_3$ | 2100 | 300 |
| Embodiment 12 | $Fe_{0.25}Co_{0.5}Ni_{0.25}Sb_3$ | 2200 | 350 |
| Embodiment 13 | $Fe_{0.5}Ni_{0.5}Sb_3$ | 2050 | 300 |
| Embodiment 14 | $Fe_{0.5}Ni_{0.5}As_3$ | 1900 | 400 |
| Embodiment 15 | $CoSi_{1.5}S_{1.5}$ | 1700 | 350 |
| Embodiment 16 | $CoSn_{1.5}S_{1.5}$ | 1750 | 300 |
| Embodiment 17 | $CoSn_{1.5}Se_{1.5}$ | 1750 | 300 |
| Embodiment 18 | $RhSn_{1.5}S_{1.5}$ | 1800 | 250 |
| Embodiment 19 | $IrSn_{1.5}S_{1.5}$ | 1800 | 250 |
| Embodiment 20 | $Li_{0.001}Co_{0.5}Ni_{0.25}Fe_{0.25}Sb_3$ | 2200 | 700 |
| Embodiment 21 | $Li_{0.001}CoSb_3$ | 2000 | 300 |
| Embodiment 22 | $Li_{0.001}Fe_{0.5}Ni_{0.5}Sb_3$ | 2000 | 350 |
| Embodiment 23 | $Li_{0.01}Fe_{0.5}Ni_{0.5}Sb_3$ | 2100 | 400 |
| Embodiment 24 | $Li_{0.5}Ni_{0.5}Fe_{0.5}Sb_3$ | 2100 | 400 |
| Embodiment 25 | $Ni_{0.5}Fe_{0.25}Cu_{0.25}Sb_3$ | 2000 | 400 |
| Embodiment 26 | CoSb | 1500 | 250 |
| Embodiment 27 | $Li_{0.1}CoSb$ | 2100 | 350 |
| Embodiment 28 | $LiCoSb_3$ | 2200 | 400 |

TABLE 2

| Embodiment number | Negative electrode active material | Discharge capacity (mAh) | Cycle life (cycles) |
|---|---|---|---|
| Embodiment 29 | $CoAlSb_2$ | 1800 | 500 |
| Embodiment 30 | $CoPbSb_2$ | 1600 | 400 |
| Embodiment 31 | $CoBiSb_2$ | 2000 | 600 |
| Embodiment 32 | $CoBSb_2$ | 1700 | 400 |
| Embodiment 33 | $CoSi_{0.5}P_{0.5}Sb_2$ | 2500 | 300 |
| Embodiment 34 | $CoIn_{0.5}Sn_{0.5}Sb_2$ | 2400 | 300 |
| Embodiment 35 | $CoAs_{0.5}Ga_{0.5}Sb_2$ | 2000 | 400 |
| Embodiment 36 | $Ni_{0.5}Mn_{0.5}Sb_3$ | 1800 | 400 |
| Embodiment 37 | $Fe_{0.75}V_{0.25}Sb_3$ | 1900 | 300 |
| Embodiment 38 | $Ni_{0.5}Ir_{0.5}Sb_3$ | 1700 | 300 |
| Embodiment 39 | $Fe_{0.5}Ti_{0.5}Sb_3$ | 1500 | 400 |
| Embodiment 40 | $CoSb_2$ | 2000 | 500 |
| Embodiment 41 | $NiSb_2$ | 2400 | 600 |
| Embodiment 42 | $FeSb_2$ | 1800 | 400 |
| Embodiment 43 | $CrSb_2$ | 1900 | 400 |

TABLE 3

| Embodiment number | Negative electrode active material | Discharge capacity (mAh) | Cycle life (cycles) |
|---|---|---|---|
| Embodiment 44 | $Mn_2Sb$ | 1200 | 500 |
| Embodiment 45 | $Cu_2Sb$ | 1000 | 480 |
| Embodiment 46 | $Cu_3Sb$ | 850 | 550 |
| Embodiment 47 | $Ni_3Sb$ | 900 | 530 |
| Embodiment 48 | $Ni_5Sb_2$ | 1000 | 480 |
| Embodiment 49 | $Ni_7Sb_3$ | 1100 | 450 |
| Embodiment 50 | $Ni_2MnSb$ | 850 | 530 |
| Embodiment 51 | $Co_2MnSb$ | 700 | 570 |
| Embodiment 52 | FeVSb | 1000 | 500 |
| Embodiment 53 | CoTiSn | 1200 | 480 |
| Embodiment 54 | NiTiSb | 1000 | 520 |
| Embodiment 55 | CoNbSb | 900 | 500 |
| Embodiment 56 | CoVSb | 1000 | 500 |
| Embodiment 57 | $LiMn_2Sb$ | 1300 | 550 |
| Embodiment 58 | $Li_{0.01}Cu_2Sb$ | 1050 | 520 |
| Comparative | Al | 1000 | 150 |

TABLE 3-continued

| Embodiment number | Negative electrode active material | Discharge capacity (mAh) | Cycle life (cycles) |
|---|---|---|---|
| Example 1 Comparative Example 2 | Sn | 1300 | 100 |
| Comparative Example 3 | SnO | 780 | 50 |
| Comparative Example 4 | $SnO_2$ | 700 | 80 |
| Comparative Example 5 | Sb | 1200 | 120 |
| Comparative Example 6 | Bi | 1200 | 150 |
| Comparative Example 7 | Li | 1400 | 80 |
| Comparative Example 8 | Li—Al Alloy | 1200 | 120 |
| Comparative Example 9 | C | 300 | 1000 |

It is seen from the above results that the negative electrode active materials according to the invention provide nonaqueous electrolyte secondary batteries having large capacities and superior charging/discharging cycle characteristics.

Embodiment 59

Batteries were manufactured by using, as negative electrode active materials, $Ni_2MgSb$ powders having average crystal particle diameters of 10 μm (A), 1 μm (B), 100 nm (C), 10 nm (D), and 5 nm (E). Constant voltage charging (0.5 C, 4 V) was performed for 3 hours and then the capacity was measured after 0.5-C discharging (final discharge voltage: 2.4 V). The number of cycles after which the capacity decreased to 80% of the value at the first cycle was employed as the cycle life. The cycle life was represented by c, b, a, and aa when the number of cycles was less than 100, 100–299, 300–499, 500 or more, respectively. Results are summarized in Table 4.

TABLE 4

| $Ni_2MnSb$ sample | (A) | (B) | (C) | (D) | (E) |
|---|---|---|---|---|---|
| Cycle life | c | b | a | aa | aa |

For the $Ni_2MnSb$ negative electrodes of (A)–(E), lattice constant variations between states before and after charging were measured by X-ray diffraction and volume variations of the unit lattice ($V_0$: volume before charging, $V_1$: volume after charging) were calculated. Values of $(V_1-V_0)/V_0$ were about 0.06. If this value is substituted into Formula (2), a value 0.83 μm is obtained. This result supports the finding of the invention that the cycle life characteristic is improved if the average crystal particle diameter is smaller than this value.

Embodiment 60

CuMgSb powders having average crystal particle diameters of 100 μm (F), 10 μm (G), 1 μm (H), 100 nm (I), and 10 nm (J) were synthesized and batteries were manufactured in the same manner as in Embodiment 59. The manufactured batteries were subjected to a cycle test under the same conditions as in Embodiment 59. Results are summarized in Table 5.

TABLE 5

| CuMgSb sample | (F) | (G) | (H) | (I) | (J) |
|---|---|---|---|---|---|
| Cycle life | c | b | a | a | aa |

For the CuMgSb negative electrodes of (F)–(J), lattice constant variations between states before and after charging were measured by X-ray diffraction and volume variations of the unit lattice ($V_0$: volume before charging, $V_1$: volume after charging) were calculated. Values of $(V_1-V_0)/V_0$ were about 0.048. If this value is substituted into Formula (2), a value 1.3 μm is obtained. This result supports the finding of the invention that the cycle life characteristic is improved if the average crystal particle diameter is smaller than this value.

Embodiment 61

Manufacture of Negative Electrode A Co powder having purity of 99% and an average particle diameter of 20 μm and an Sb powder having purity of 99.9% and an average particle diameter of 20 μm were mixed with each other at an atomic equivalent ratio of 2:1 and then stirred sufficiently with a V mixer. A resulting mixed powder was put in an alumina crucible and was caused to react with each other by heat-treating those at 600° C. for 120 hours in an argon gas flow. An XRD analysis on a heat-treated substance showed only one peak of a $CoSb_3$ phase having a $CoAs_3$ structure, which indicated that this substance is of a $CoSb_3$ single phase. The reaction product that cohered as a result of the reaction was ground into a $CoSb_3$ powder having an average particle diameter of 20 μm by using an agate mortar.

Then, an $Li_3N$ powder having purity of 99% and an average particle diameter of 20 μm and a Co powder having purity of 99% and an average particle diameter of 20 μm were mixed with each other with an Li-to-Co atomic ratio of 2.6:0.4 and then stirred sufficiently. An $Li_{2.6}Co_{0.4}N$ powder was produced by putting a resulting mixed powder in an agate crucible and firing it at 700° C. for 8 hours in a high-purity (99.9%) nitrogen atmosphere.

A negative electrode was produced by mixing together this $CoSb_3$-phase powder of 72.3 wt. %, an $Li_{2.6}Co_{0.4}N$ powder of 12.7 wt. %, graphite 5 wt. %, acetylene black 3 wt. %, and PVdF of 7 wt. % with addition of an NMP solution, applying a resulting mixture to a collector of 12-μm thick copper foil, and drying and pressing the mixture.

Negative electrodes in which the contents of the $CoSb_3$-phase powder and the $Li_{2.6}Co_{0.4}N$ powder were varied in ranges of 76.5–85 wt. % and 0–8.5 wt. %, respectively, were manufactured in the same manner.

Manufacture of Battery

Figure 2:
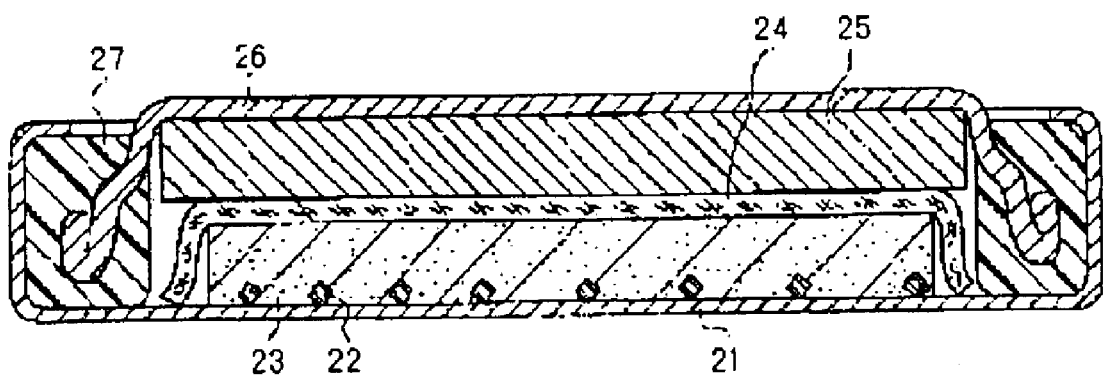
FIG. 2 is a partial sectional view of an example of a nonaqueous electrolyte battery (coin-type battery) according to the invention.

By using each of the above negative electrodes, a coin-type battery of 20 mm in diameter and 1.6 mm in thickness shown in FIG. 2 was manufactured. In FIG. 2, reference numeral 21 denotes a battery case; 22, a collector; 23, an electrode; 24, a separator; 25, a metal Li electrode; 26, a sealing plate; and 27, a gasket. The collector 22 that is a stainless steel expanded metal member is welded to the inside surface of the battery case 21. The electrode 23 that is worked into a 15-mm-diameter disc is press-attached to the collector 22 from above. After an electrolyte liquid is injected so as to fall onto the electrode 23, the electrode 23 was covered with the polypropylene separator 24 and the sealing plate 26 to which the disc-shaped metal Li electrode 25 (counter electrode) is press-attached inside with the gasket interposed in between. A coin-type battery was completed by caulking an end portion of the case 21. The electrolyte liquid was a nonaqueous electrolyte solution prepared by dissolving lithium phosphate hexafluoride (LiPF$_6$) in a mixed solvent (volume mixing ratio: 1:2) of ethylene carbonate (EC) and methylethyl carbonate (MEC) at 1.0 mol/l.

Test Method

For the coin-type batteries manufactured in the above manner, constant current (0.5 mA/cm$^2$) charging and discharging (upper cut voltage: 2.0 V, lower cut voltage: 0.1 V). Since the batteries are so designed as to be charged with excess counter electrode metal Li for an expected electrode capacity, basically the charging/discharging characteristic depends on only the test electrode.

TABLE 6

| sample | Active material constituents and contents | Initial Coulomb efficiency (%) | Discharge capacity (mAh/g) |
|---|---|---|---|
| A | CoSb$_3$(80.8 wt. %)/Li$_{2.6}$Co$_{0.4}$N(4.2 wt. %) | 87 | 660 |
| B | CoSb$_3$(76.5 wt. %)/Li$_{2.6}$Co$_{0.4}$N(8.5 wt. %) | 91 | 680 |
| C | CoSb$_3$(72.3 wt. %)/Li$_{2.6}$Co$_{0.4}$N(12.7 wt. %) | 96 | 700 |
| Comparative Example | CoSb$_3$(85 wt. %) | 84 | 630 |

Embodiment 62

Batteries were manufactured and evaluated in the same manners as in Embodiment 61 except that NiSb$_2$ and Li$_{2.6}$Cu$_{0.4}$N were used as the active material.

TABLE 7

| sample | Active material constituents and contents | Initial Coulomb efficiency (%) | Discharge capacity (mAh/g) |
|---|---|---|---|
| D | NiSb$_2$(80.8 wt. %)/Li$_{2.6}$Cu$_{0.4}$N(4.2 wt. %) | 87 | 590 |
| E | NiSb$_2$(76.5 wt. %)/Li$_{2.6}$Cu$_{0.4}$N(8.5 wt. %) | 90 | 610 |
| F | NiSb$_2$(72.3 wt. %)/Li$_{2.6}$Cu$_{0.4}$N(12.7 wt. %) | 93 | 630 |
| G | NiSb$_2$(68 wt. %)/Li$_{2.6}$Cu$_{0.4}$N(17 wt. %) | 96 | 650 |
| Comparative Example | NiSb$_3$(85 wt. %) | 84 | 570 |

Embodiment 63

Batteries were manufactured and evaluated in the same manners as in Embodiment 61 except that Ni$_2$MnSb and Li$_{2.6}$Co$_{0.4}$N were used as the active material.

TABLE 8

| sample | Active material constituents and contents | Initial Coulomb efficiency (%) | Discharge capacity (mAh/g) |
|---|---|---|---|
| H | NiS$_2$MnSb(80.8 wt. %)/Li$_{2.6}$Co$_{0.4}$N(4.2 wt. %) | 72 | 250 |
| I | NiS$_2$MnSb(76.5 wt. %)/Li$_{2.6}$Co$_{0.4}$N(8.5 wt. %) | 84 | 300 |
| J | NiS$_2$MnSb(72.3 wt. %)/Li$_{2.6}$Co$_{0.4}$N(12.7 wt. %) | 96 | 350 |
| Comparative Example | Ni$_3$Sb(85 wt. %) | 60 | 200 |

It is seen from the above results that the invention increases the initial Coulomb efficiency of the lithium compound.

The disclosures of Japanese priority Application Nos. 11-225491 filed Aug. 9, 1999 and 2000-95529 filed Mar. 30, 2000 are hereby incorporated by reference into the application.

What is claimed as new and is intended to be secured by Letters Patent is:

1. A nonaqueous electrolyte battery comprising:
    a positive electrode;
    a negative electrode having a negative electrode active material that inserts and de-inserts an alkali metal, the negative electrode active material being a compound that is expressed by Formula (1):

$$A_zMX_y \qquad (1)$$

where A is at least one element selected from the group consisting of the alkali metals, M is at least one element selected from the group consisting of Ti, V, Cr, Mn, Fe, Co, Ni, Cu, Ru, Rh, Pd, Os, Ir, Pt and Mg, and X is at least one element selected from the group consisting of B, Al, Si, P, Ga, Ge, As, In, Sn, Sb, Pb and Bi, $0 \leq z \leq 20$, and $0.2 \leq y \leq 6$;

and wherein said compound has an average crystal particle diameter that is greater than or equal to 1 nm and less than or equal to a value given by Formula (2):

$$3.0/(V_1-V_0/V_0)^2 [\text{nm}] \qquad (2)$$

wherein $V_0$ and $V_1$ are volumes of the compound before and after charging, respectively; and a nonaqueous electrolyte.

2. The nonaqueous electrolyte battery according to claim 1, wherein, in the compound expressed by Formula (1), M is at least one element selected from the group consisting of Co, Fe, Ni, Cu; and Cr and X is at least one element selected from the group consisting of Al, P, As, Sb and Bi.

3. The nonaqueous electrolyte battery according to claim 2, wherein, in the compound expressed by Formula (1), elemental component X comprises at least one element of which Sb is a main element.

4. The nonaqueous electrolyte battery according to claim 1, wherein the compound expressed by Formula (1) has at least one structure selected from the group consisting of an NiAs structure, a $FeS_2$ structure, and a $CoAs_3$ structure.

5. The nonaqueous electrolyte battery according to claim 1, wherein in Formula (1) z is in a range of $0.01 \leq z \leq 10$.

6. The nonaqueous electrolyte battery according to claim 1, wherein in Formula (1) y is in a range of $0.2 \leq y \leq 3.2$.

7. The nonaqueous electrolyte battery according to claim 6, wherein in Formula (1) y is in a range of $0.8 \leq y \leq 3.2$.

8. The nonaqueous electrolyte battery according to claim 1, wherein the negative electrode active material has an average particle diameter in a range of 0.01–100 ppm.

9. The nonaqueous electrolyte battery according to claim 1, wherein the negative electrode consists of the negative electrode active material, a conductive material, and a binder which is a material selected from the group consisting of polytetrafluoroethylene, polyvinylidene fluoride, fluoride rubbers, ethylene-butadiene rubber and carboxymethylcellulose.

10. The nonaqueous electrolyte battery according to claim 1, wherein the negative electrode consists of the negative electrode active material, a conductive material, which is a material selected from the group consisting of acetylene black, carbon black and graphite and a binder.

11. The nonaqueous electrolyte battery according to claim 1, wherein the negative electrode consists of the negative electrode active material, a conductive material, and a binder which are blended in amounts of 70–95 wt %, 0–25 wt %, and 2–10 wt %, respectively.

12. A nonaqucous electrolyte battery, comprising:

a positive electrode;

a negative electrode having a negative electrode active material that inserts and de-inserts an alkali metal, the negative electrode active material being a compound selected from the group consisting of $Li_zNi_xFe_{1-x}Sb_y$, $Li_zNi_xFe_{1-x-w}Co_wSb_y$, $Li_zCo_xNi_{1-x}Sb_y$, $Li_zCo_xFe_{1-x}Sb_y$, $Li_zCoBi_{1-y}Sb_y$, $Li_zCoSi_y$, and $Li_zCoAl_y$, where $0 \leq z \leq 20$, $0.2 \leq y \leq 6$, $0 \leq x \leq 1$, and $0 \leq w \leq 1$; and a non-aqueous electrolyte.

* * * * *

UNITED STATES PATENT AND TRADEMARK OFFICE
CERTIFICATE OF CORRECTION

PATENT NO. : 6,884,548 B2
DATED : April 26, 2005
INVENTOR(S) : Inagaki et al.

It is certified that error appears in the above-identified patent and that said Letters Patent is hereby corrected as shown below:

<u>Title page,</u>
Items [45] and [*] Notice, should read as follows:
-- [45] Date of Patent: *Apr. 26, 2005

[*] Notice: Subject to any disclaimer, the term of this
              patent is extended or adjusted
              under 35 U.S.C. 154(b) by 0 days.

This Patent is subject to a terminal disclaimer. --

Signed and Sealed this

Twenty-eighth Day of June, 2005

JON W. DUDAS
*Director of the United States Patent and Trademark Office*